United States Patent [19]
Wiederhold et al.

[11] Patent Number: 5,888,384
[45] Date of Patent: Mar. 30, 1999

[54] LIQUID FILTER

[75] Inventors: Roland Wiederhold, Steinhelm/Murr; Rainer Mueller, Ludwigsburg; Leipelt Rudolf, Marbach, all of Germany

[73] Assignee: Filterwerk Mann & Hummel GmbH, Ludwigsburg, Germany

[21] Appl. No.: 958,125

[22] Filed: Oct. 27, 1997

[30] Foreign Application Priority Data

Oct. 26, 1996 [DE] Germany ..................... 196 44 647.3

[51] Int. Cl.⁶ .................................................. B01D 27/06
[52] U.S. Cl. ...................... 210/130; 210/186; 210/232; 210/248; 210/440; 210/441; 210/493.2
[58] Field of Search .................... 210/DIG. 17, 130, 210/168, 186, 181, 232, 238, 416.5, 437, 440, 441, 493.2, 248; 55/498

[56] References Cited

U.S. PATENT DOCUMENTS

| | | | |
|---|---|---|---|
| 1,235,898 | 8/1917 | Jay | 123/196 |
| 2,057,932 | 10/1936 | Bolser | 210/133 |
| 3,297,160 | 1/1967 | Humbert, Jr. | 210/94 |
| 4,592,836 | 6/1986 | Chiao | 210/168 |
| 5,042,999 | 8/1991 | Ernst et al. | 55/482 |
| 5,366,400 | 11/1994 | Kucik | 440/88 |
| 5,374,355 | 12/1994 | Habiger et al. | 210/440 |
| 5,538,626 | 7/1996 | Baumann | 210/130 |
| 5,584,987 | 12/1996 | Mules | 210/130 |

*Primary Examiner*—Jay H. Woo
*Assistant Examiner*—Fred Prince
*Attorney, Agent, or Firm*—Evenson, McKeown, Edwards & Lenehan, P.L.L.C.

[57] ABSTRACT

A fluid filter having a substantially pot-shaped housing 10 in which is disposed a filter insert 11 including a pleated filter element 18 and end plates 19 and 20. The housing has a mounting flange 12 and a cover 13. The cover is connected to the mounting flange by a threaded connection or a bayonet connection. The fluid filter is attached by the mounting flange 12 to a supporting structure by at least one catch or a hinge in the form of a holding flange 29 and a projection 30.

17 Claims, 2 Drawing Sheets

LIQUID FILTER

BACKGROUND OF THE INVENTION

This invention relates to a filter for fluids which has a substantially pot-like housing which comprises a mounting flange and a cover, and a filter insert disposed in the housing, which comprises a pleated filter element with end plates. As used herein the term "pot-like" refers to a cylindrical shape with at least one open axial end.

U.S. Pat. No. 5,538,626 (=EP 692,292) discloses a fluid filter, especially for oil or fuel in an internal combustion engine. This fluid filter consists of a filter housing with at least one fluid inlet and one fluid return passage, and a removable cover closing the filter housing in a leak-proof manner. A single replaceable filter insert is disposed in the filter housing. The fluid filter is affixed to a supporting structure by a hollow fastening screw forming a fluid passageway.

A disadvantage of this state of the art is to be seen in the fact that, in a fluid filter subjected to great pressure fluctuations, considerable sealing problems arise since it is mounted by a central screw. In a replaceable filter element which is regularly replaced and in which the gasket is also regularly renewed, such a danger would not exist to this extent in a filter which would assure over a long period of time a reliable seal with this kind of screw mounting.

U.S. Pat. No. 5,042,999 (=DE 3,918,347) discloses an air intake filter for internal combustion engines, which has a pot-like housing in which a filter insert is disposed. The mounting of the housing on a part of the engine is achieved by a track with a sliding block and supporting surfaces as well as snap catches. This construction, however, is unsuited to fluid filters since, as already mentioned, pressure fluctuations and elevated internal pressures can occur. An effective seal cannot be achieved with this type of mounting.

SUMMARY OF THE INVENTION

It is therefore an object of the invention to provide a fluid filter which avoids the aforementioned disadvantages.

Another object of the invention is to provide a fluid filter which can be reliably attached and sealed to a supporting structure at low cost.

These and other objects have been achieved in accordance with the present invention by providing a fluid filter comprising a substantially pot-shaped housing with a cover, a filter insert disposed in the housing, the filter insert comprising a pleated filter element and first and second end plates, and the housing comprising a mounting flange which is fastened to a supporting structure by at least one catch or hinge.

The important advantage of the invention is that the mounting flange is fastened to a supporting structure with a catch means and/or hinges, while both the catch means and the hinge have great inherent strength and thus a reliable seal is obtained. Of course, it is alternatively possible to fasten the fluid filter to the supporting structure by the catch means alone.

According to another embodiment of the invention, a screw fastening or the like is provided in support of this fastening. Precisely in the case of constricted space conditions it is advantageous to locate the catch means or hinge where only little space is available, while the screw fastening can be disposed in a place that provides sufficient space for driving the screw.

Another embodiment of the invention provides for configuring the hinge as an open, releasable hinge. Quite simply this can consist of an undercut on the supporting structure which is engaged by a tongue on the mounting flange. For visual inspection, the gasket that is placed between the mounting flange and the supporting structure according to an embodiment can be provided with a tongue or a sealing means which extends outward into the a visible location. This permits checking in a simple manner to make sure a gasket is in place.

The housing, or the mounting flange and the cover of the filter preferably are composed of a plastic, especially a thermoplastic. The parts can thus be manufactured at low cost and contribute to a reduction in weight.

In one embodiment of the invention the cover is provided with a drain screw. Of course, it is also possible to provide a drain valve in the fluid filter. This is advantageous especially when an upright kind of design is preferred, i.e., an arrangement in which the oil can drain by gravity toward the supporting structure.

According to another embodiment, an oil-water heat exchanger can also be integrated with the filter housing. It is also possible, of course, to arrange such an oil cooler as a distinct device separate from the fluid filter, and connect it to the filter with appropriate tubing.

In order to support the filter insert it is desirable to provide a central tube. A bypass valve can be provided in this central tube to bypass the filter insert if the pressure differential exceeds acceptable values. The central tube can be disposed either on the cover or on the mounting flange. When the filter insert is replaced the central tube thus remains on one of the two housing parts, and only the filter insert with its two end plates is replaced.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described hereinafter with reference to illustrative preferred embodiments depicted in the accompanying drawings in which.

DETAILED DESCRIPTION OF PREFERRED EMBODIMENTS

Figure 1:
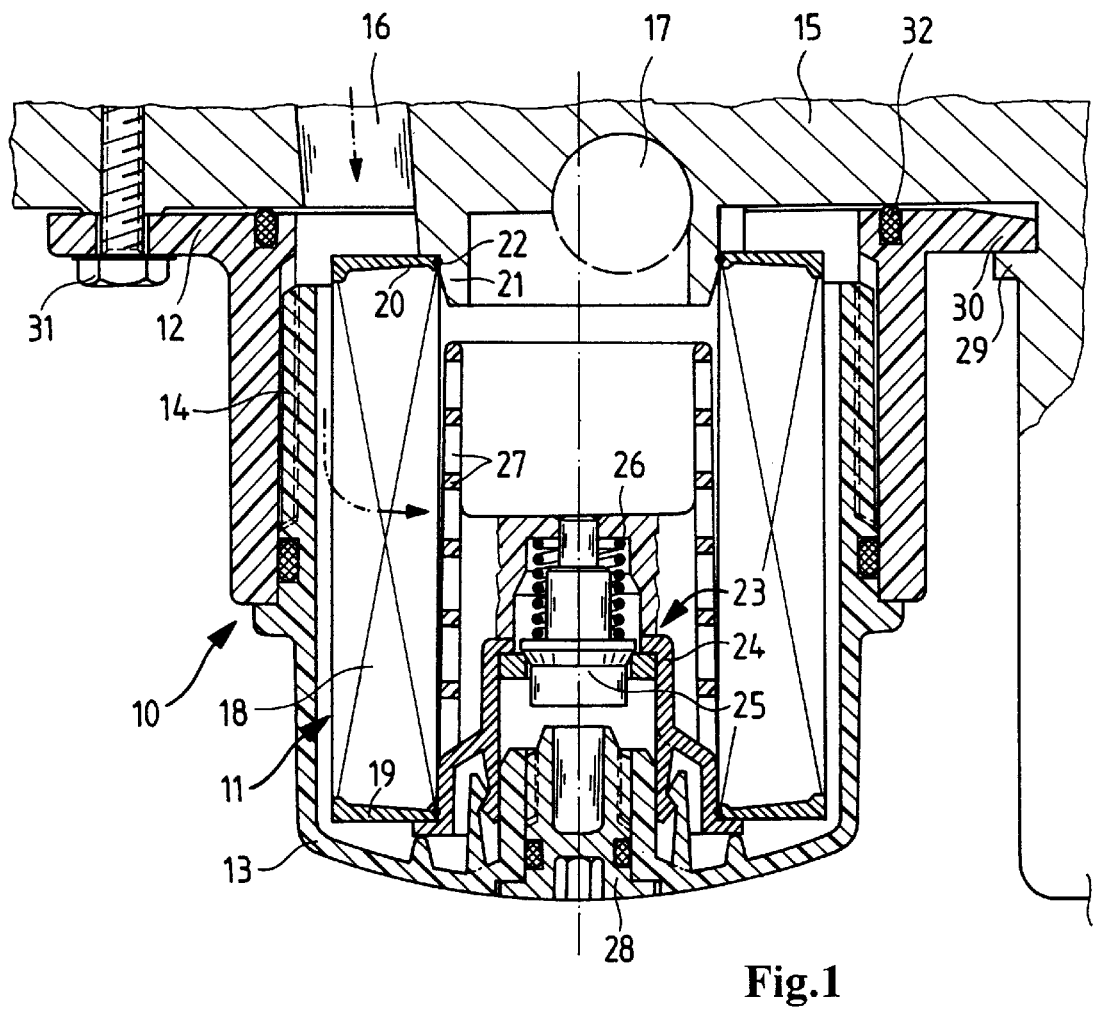
FIG. 1 is a sectional view of a first fluid filter embodiment according to the invention.

The fluid filter according to FIG. 1 comprises a housing 10 in which a filter insert 11 is disposed. The housing comprises a mounting flange 12 as well as a cover 13. In the illustrated embodiment, the cover is attached to the mounting flange by a screw thread 14. Both the cover 13 and the mounting flange 12 are made of a thermoplastic synthetic resin. If due to high temperatures or the need for chemical stability a thermoplastic is not appropriate, a metallic material can also be used for the cover and mounting flange. A filter supporting structure 15 has a fluid inlet 16 as well as a fluid outlet 17.

The filter insert 11 comprises a pleated filter element 18 with end plates 19 and 20. The end plate 20 forms, in conjunction with a sealing flange 21 of the supporting structure 15, a radial seal 22. On the opposite end of the filter element is a bypass valve 23 comprising a valve disk or seat 24 and a valve plate or body 25, as well as a compression spring 26. The bypass valve 24 is disposed within a supporting or central tube 27. A drain outlet screw 28 is provided on the cover 13 for removing the fluid from the filter housing. The fluid that is to be cleaned flows through the fluid inlet 16 into the outer area of the housing 10, then through the filter insert from the outside into the center, and exits the housing 10 clean through the central tube 27 and the fluid outlet 17.

On the right side of the Figure, the supporting structure 15 has a holding flange 29. A projection 30 of the mounting flange 12 rests under the holding flange 29 and in this form acts as an open hinge. On the side of mounting flange 12 opposite from the holding flange 29, the mounting flange 12 is fastened by a screw 31 to the supporting structure. A gasket 32 serves to provide a reliable sealing of the fluid chamber between the supporting structure 15 and mounting flange 12.

To replace the filter insert 11, first the drain screw 28 is opened so that the fluid can escape. Then the cover 13, on which the central tube 27 is situated, is removed. The filter insert 11 can be taken off from the central tube and can be replaced with a new filter insert.

Alternatively, instead of the screw-threaded cover, a closed pot housing can be provided. To replace the filter insert this closed pot can be removed from the supporting structure and the filter insert then removed from the closed pot.

Figure 2:
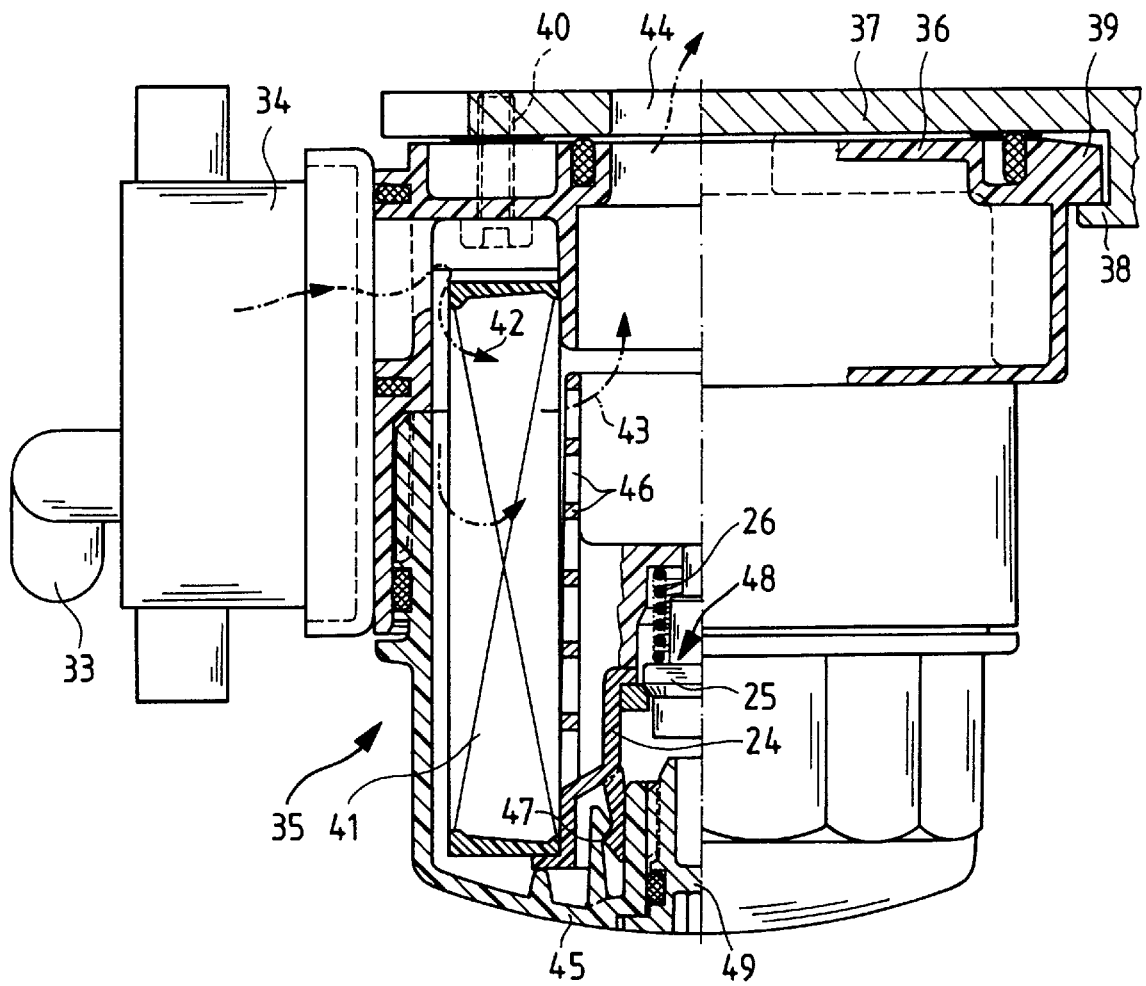
FIG. 2 is a sectional view of a fluid filter variant with an oil/water heat exchanger.

FIG. 2 shows a fluid filter variant with a heat exchanger. The fluid filter serves to clean lubricating oil in an internal combustion engine. This oil is first cooled in the preceding heat exchanger, and then filtered and fed to the lubricant circuit. The oil to be cooled and cleaned passes through the fluid inlet 33 into the oil/water heat exchanger 34. The heat exchanger is shown only schematically and comprises a stacked type of heat exchanger with the inlet and outlet lines for the coolant. The heat exchanger is flange-mounted laterally on the housing 35. The housing itself is fastened with a mounting flange 36 to the supporting structure 37. Here, again, the supporting structure 37 has a holding flange 38 under which a projection 39 of the mounting flange 36 rests. On the opposite side the mounting flange 36 from holding flange 38, the mounting flange 36 is attached to the supporting structure 37 by a screw 40. The screw fastening can be situated, as shown, inside of the filter housing 35. This reduces the amount of space required for the fastening means.

In the interior of the housing 35 is a filter insert 41. The cooled oil flows through it as indicated by the arrow 42. The cleaned oil leaves the fluid filter according to arrow 43 and flows through the outlet opening 44. A central tube 46 is attached by a snap fastener 47 to the cover 45. A pressure relief or bypass valve 48 is disposed in the central tube. Underneath the pressure relief valve 48 is a draining screw 49 for removal of the oil when the filter insert 41 is changed.

It is, of course, possible to make the fluid filter from aluminum or steel, and/or to make the oil/water heat exchanger separate from the filter.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A fluid filter comprising:
    a substantially pot-shaped housing with a cover,
    a filter insert disposed in said housing, said filter insert comprising a pleated filter element and first and second end plates, and
    said housing comprising a mounting flange having a projection, said projection resting under and being fastened to a holding flange of a supporting structure, said holding flange and projection acting as at least one catch or hinge.

2. A fluid filter according to claim 1, further comprising a screw attachment on said mounting flange opposite from said projection for attaching said screw attachment to said supporting structure.

3. A fluid filter according to claim 1, wherein said mounting flange is fastened to the supporting structure by an open, releasable hinge.

4. A fluid filter according to claim 1, further comprising a gasket arranged between the mounting flange and the supporting structure.

5. A fluid filter according to claim 4, wherein said gasket comprises an outwardly extending portion which extends from between the housing and the supporting structure into a visible area.

6. A fluid filter according to claim 1, wherein at least one of said mounting flange and said cover is formed of a synthetic resin material, and said cover is attached to the mounting flange by a threaded connection or a bayonet connection.

7. A fluid filter according to claim 1, wherein said cover is provided with a drain screw or drain valve which opens a filter drain opening when the cover is opened.

8. A fluid filter according to claim 1, further comprising an oil/water heat exchanger.

9. A fluid filter according to claim 8, wherein said heat exchanger is integrated into said housing.

10. A fluid filter according to claim 8, wherein said heat exchanger is flange-mounted on said housing.

11. A fluid filter according to claim 1, wherein said filter insert has a central opening in which a central support tube is received.

12. A fluid filter according to claim 11, wherein said central support tube is mounted on said cover.

13. A fluid filter according to claim 11, further comprising a filter bypass valve arranged inside said central support tube.

14. A fluid filter comprising:
    a substantially pot-shaped housing with a cover, said housing comprising an annular mounting flange having a projection and a screw attachment on an opposite side of the mounting flange from the projection, said projection resting under and being fastened to a holding flange of a supporting structure, said holding flange and projection acting as at least one catch or hinge, said screw attachment being fastened to said supporting structure;
    a filter insert disposed in said housing, said filter insert comprising a pleated filter element and first and second end plates; and
    a gasket arranged between the mounting flange and the supporting structure.

15. A fluid filter according to claim 14, wherein said mounting flange is fastened to the supporting structure by an open releasable hinge.

16. A fluid filter according to claim 14, further comprising an oil/water heat exchanger.

17. A fluid filter according to claim 16, wherein said heat exchanger is integrated into said housing.

* * * * *